Oct. 30, 1962 R. W. WATERFILL 3,060,960
CURTAIN VALVE
Filed April 24, 1959

INVENTOR.
ROBERT W. WATERFILL
BY
Pollard Johnston Smythe & Robertson
ATTORNEYS

United States Patent Office 3,060,960
Patented Oct. 30, 1962

3,060,960
CURTAIN VALVE
Robert W. Waterfill, Montclair, N.J., assignor, by mesne assignments, to Buensod-Stacey Corporation, a corporation of Ohio
Filed Apr. 24, 1959, Ser. No. 808,776
17 Claims. (Cl. 137—514)

This invention relates to fluid flow control devices and particularly to an arrangement for stabilizing the action of a fluid flow control valve by employing the inertia of means that is instantly responsive to any sudden change of the valve position.

It is well known that variations of fluid pressure in a fluid distribution line or duct may result in an inconstant or varying rate of flow. In air conditioning systems, particularly those employing a central air conditioning apparatus from which air is delivered to a plurality of individual distributing units, pressure variations in the air delivery line or ducts occur frequently by reason of the irregular and changing demand for air in the rooms or zones being conditioned. Variations of pressure within the ducts tend to cause objectionable changes in air distribution, noises due to valve flutter, and other undesirable effects.

Various types of air flow or volume control regulators have been employed in such systems in order to maintain substantially constant the rate of flow of air from a regulator to a room or zone being conditioned. Certain types of these flow control regulators involve the use of flexible curtain devices that are adapted to cooperate with rigid, motion limiting means having fluid flow passage means therein. The flexible curtain means may be resiliently urged into a position for providing predetermined flow conditions for a given requirement. In the event there occurs a sudden increase or decrease in pressure or volume of flow upstream from the regulator, the flexible curtain means is moved into or away from the motion limiting means, thereby decreasing or increasing the effectiveness of the fluid flow passage means so as to maintain substantially constant the flow of fluid to the room or zone being conditioned. This action is a rolling or peeling off of the curtain means relative to the motion limiting means.

Sudden increases or decreases in pressure or volume flow often occur in a periodic fashion, causing a hunting or fluttering action of the flexible curtain means, thereby tending to defeat the purpose for which the flow control regulator was designed, i.e., constant flow of conditioned air; and to produce objectionable flutter noises within the system.

A principal object of this invention is to provide an anti-hunting and flutter-resisting fluid flow control regulator which will be sensitive to pressure and volume fluctuations within an air conditioning system.

Another object of the invention is to provide such a fluid flow control regulator in which a flexible curtain means responds to variations in pressure and fluid flow to maintain substantially constant the flow of conditioned air to a room or zone being conditioned.

Another object of the invention is to provide a flexible curtain fluid flow regulator in which the inertia of a mass that is movable in response to curtain movement is employed to resist flutter and hunting of the flexible curtain means.

Another object of the invention is to provide such a fluid flow regulator in which the inertia of the mass does not adversely affect the sensitivity or control of the flow regulator.

Another object of the invention is to provide such a flow regulator in which the movable flexible curtain means and the inertia-producing mass are a self-contained, unitary structure.

While the present invention can be employed in conjunction with low-pressure systems, it is particularly useful when it is employed with high-pressure arrangements. It can be used as described hereinafter in conjunction with high-pressure systems in which the size of the ducts leading to the volume regulators have a maximum diameter of about two inches to ten inches, or the equivalent, the pressure being about two to six inches of water static pressure and the potential velocity of air in the ducts being between about 1500 and 3500 feet per minute, although these values may vary slightly from what is given in what is known as a high-pressure system.

In one aspect of the invention, a duct leading to a room or zone to be conditioned may be provided with a flow control regulator of the pressure sensitive type including a housing having walls that include fluid passage means such as perforations or the like, and a flexible curtain means normally adapted to be held away from the walls to permit a predetermined flow of fluid therethrough.

Increases and decreases of the pressure within the duct on the upstream side of the regulator cause movement of the flexible curtain means relatively to the perforated walls to vary the flow of fluid through the regulator. Two curtains are preferred but one could be used.

In another aspect of the invention, the curtain operating means may include a reciprocable rod connected to the flexible curtain means by a linkage, and resilient adjustable means may act on the rod to vary the action of the curtain means incident to variations in pressure on the upstream side of the regulator.

The movement of the reciprocable rod may be employed to move a mass, the inertia of which will have a damping tendency on the rod movement and thereby tend to reduce any hunting tendency or flutter of the flexible curtain means when the latter is subjected to periodic variations or reversals of pressure on the upstream side of the regulator.

In still another aspect of the invention, the inertia-producing mass may take any form and may be connected to any part of the movable linkage connecting the reciprocable rod to the flexible curtain means. For example, it may comprise a rotatable disc having trunnions mounted in anti-friction bearings within the regulator housing. Means may be provided between the rod and the disc for causing the reciprocations of the rod to effect rotation of the disc. This means may comprise a cable driving means wherein the ends of the cable may be anchored to spaced points along the rod with the intermediate portion of the cable wound around one of the disc trunnions.

In another aspect of the invention this means may comprise a rack formed on the reciprocable rod that may mesh with a pinion fixed to one of the disc trunnions.

In still another aspect of the invention, this means between the rod and disc may comprise a coarse threaded member that threads into a coarse threaded nut fixed to the disc such that vertical axial movement of the member causes rotation of the nut and disc.

The above as well as other objects and novel features of the invention will become apparent from the following specification and accompanying drawing which is merely exemplary.

Figures 1, 2, 3, 4, 5:
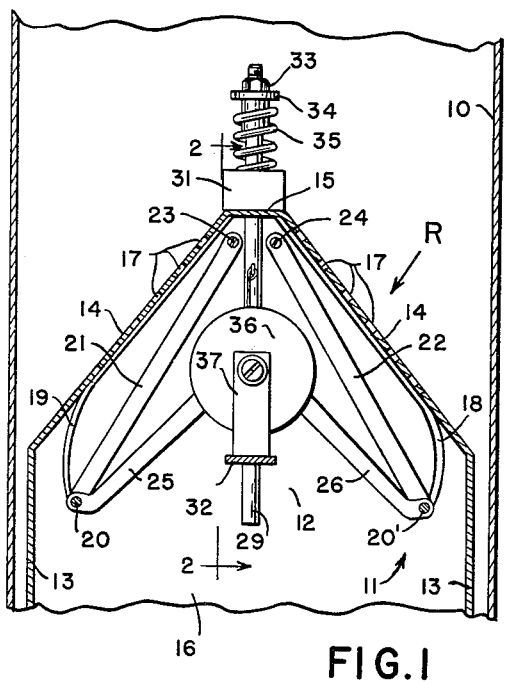
FIG. 1 is a sectional elevational view of a fluid flow regulator to which the principles of the invention have been applied.
FIG. 2 is a sectional elevational view taken substantially along line 2—2 of FIG. 1.
FIG. 3 is a sectional elevational view of a regulator including a modified form of the invention.
FIG. 4 is a sectional elevational view taken substantially along line 4—4 of FIG. 3.
FIG. 5 is a fragmentary view of a portion of the structure of FIGS. 1 and 3 including another modified form of the invention.

Referring to the drawing, and particularly to FIGS. 1 and 2, the principles of the invention are shown as applied to a regulator R located within a duct 10 so that all of the fluid within the duct 10 must pass through it prior to reaching a room or zone to be conditioned.

The regulator R may include a housing 11 having impervious end walls 12, and they may include pitched portions 14 that are joined by a crown 15 forming a roofed housing having its upstream end open at 16 to the fluid within duct 10. The pitched portions 14 may be provided with fluid passage means, and in the embodiment disclosed, this means comprises perforations 17.

Flexible curtain means 18 and 19 may be fixed along its downstream edge to the housing 11 at the juncture of the portions 14 and the crown 15 in a manner such that the curtain means 18 and 19 may pivot and progressively cover more and more of the perforations 17 when the upstream side of the means 18 and 19 is subjected to increasing upstream pressure, said curtain means rolling thereon or peeling therefrom. In the form shown, the curtain means has an edge normally spaced from the motion limiting means 14, it being angularly disposed or inclined relative thereto.

The ends of the curtain means 18 and 19 opposite those fixed to the crown 15 may be fixed to rods 20 and 20' extending throughout the dimension of the housing 11 in a direction at right angles to the paper. Two pairs of links 21 and 22 (only one pair being shown) may have their one ends pivoted to the end walls 12 at 23 and 24, while their opposite ends may be connected to the rods 20 and 20', respectively. Two pairs of links 25, 26 and 27, 28 (only one pair being shown in FIG. 1) may have their one ends connected to the rods 20 and 20', respectively, and their other ends pivotally connected to a pin 29 extending through a reciprocable rod 30.

The rod 30 may extend upwardly through a slide bearing 31 mounted on the outside of crown 15 of the housing 11. Rod 30 may extend downwardly through a guide bearing within a bracket 32 that is parallel with crown 15 and extends between end walls 12. The upper end of rod 30 may be threaded to receive a nut 33 and a washer 34. A compression spring 35 may surround rod 30 and lie between washer 34 and the top of bearing 31. The construction may be such that a predetermined compression of spring 35 may urge rod 30 upwardly, tending to collapse the linkage and curtain means 18 and 19 so that maximum fluid flow will pass through the apertures 17.

From the foregoing it is evident that variations in pressure on the upstream side of the regulator R will cause movement of the curtain means 18 and 19 toward and away from the perforated walls 14 to progressively cover and uncover the apertures 17, all for the purpose of maintaining a substantially uniform flow of fluid to the room or zone being conditioned.

In order to prevent hunting and fluttering of the curtain means 18 and 19 when the upstream pressure varies periodically, damping means may be provided which acts to resist any rapid change of condition of the curtain means 18 and 19. While this damping means may take various forms and be responsive to the movement of any of the movable elements associated with the curtain means, it is shown in FIGS. 1 and 2 as being in the form of a rotatable disc or flywheel 36.

Referring to FIG. 2, a U-shaped support 37 may be fixed to the bracket 32. Aligned holes may be provided in the upper portion of the legs of support 37 for journaling a shaft 38 within anti-friction bearings mounted within said aligned holes. The disc 36 may be fixed to the shaft 38 and the latter may extend beyond the support 37. A cable 39 may have several loops wound around the shaft 38, and its opposite ends may be fixed to pins 40 and 41 mounted on rod 30 at spaced, aligned points and movable therewith. Accordingly, any vertical movement of rod 30 immediately causes rotation of shaft 38 and flywheel 36. The inertia of the flywheel 36 tends to eliminate hunting and flutter of the curtain means 18 and 19, but does not adversely affect the control or sensitivity of the regulator since substantially no frictional force is present tending to resist the action of the curtain means.

Referring to FIGS. 3 and 4, the principles of the invention are shown as applied to a modified structure. A U-shaped bearing support 42 may be fixed to the under side of the bracket 32. A shaft 43 may be journaled in antifriction bearings located within the support 42, and a pair of flywheels 44 and 45 may be fixed to the shaft 43 by nuts 46 or the like on each side of the support 42, forming a balanced construction therewith.

A spur gear 47 may be fixed to the shaft 43 and it may be located between the legs of the U-shaped support 42. The spur gear 47 may mesh with a rack 48 located axially along the periphery of the rod 30. Accordingly, reciprocation of the rod 30 will cause rotation of the flywheels 44 and 45 which will act to dampen hunting and flutter of the curtain means 18 and 19 without adversely affecting the sensitivity and control of the regulator.

Referring to FIG. 5, the principles of the invention have been shown as applied to a modified form of the structure including a housing 49 fixed to the under side of the bracket 32. The housing 49 may fixedly support the outer race of an anti-friction bearing 50. The inner race 51 of the bearing 50 may be fixed to the outer periphery of a tubular element 52 that is integral with, or otherwise attached to, a disc 53 having a substantial mass. An internally threaded element or sleeve 54 may be fixed to the internal surface of tubular element 52 by pressing or otherwise.

The lower end of rod 30 may be provided with thread means 55. This threaded means may take any one of a number of forms and is shown as a coil of spring steel wire welded, soldered or otherwise fixed to the periphery of the rod 30. The pitch of the threads 55 formed by the coil of wire as well as the threads of the sleeve or nut 54 may be such that axial movement of the rod 30 will cause rotation of disc 53, the inertia of the latter acting to dampen hunting and flutter of the curtain means 18 and 19 without adversely affecting the sensitivity and control of the regulator.

Although the various features of the new and improved anti-hunting and anti-flutter regulator have been shown and described in detail to fully disclose several embodiments of the invention, it will be evident that numerous changes may be made in such details, certain features may be used without others without departing from the principles of the invention, and that they can be used on various types of volume regulators.

What is claimed is:

1. In a fluid flow control regulator, a member; fluid passage means within said member through which fluid is required to pass in flowing to a room or zone being conditioned; flexible curtain means pivotally connected at its one edge to said member; linkage means connected to another edge parallel to said one edge for controlling the movement of said curtain means; a reciprocable rod connected to said linkage; an adjustable resilient means for normally urging said rod in a direction to maintain said curtain means in a position relatively to said member to provide a predetermined effectiveness of said fluid passage means; a freely rotatable mass; and a connection between said rod and said mass so that the mass is rotated upon movement of the curtain means whereby the mass tends to prevent rapid reversals of movement of said rod when said curtain means is subjected to rapid fluctuations in pressure fluid.

2. In a fluid flow control regulator, a member through which fluid is required to pass in flowing to a room or zone being conditioned; fluid passage means within said member; flexible curtain means pivotally connected at its one edge to said member; linkage means connected to another edge parallel to said one edge for controlling the movement of said curtain means; a reciprocable rod connected to said linkage; an adjustable resilient means for normally urging said rod in a direction to maintain said curtain means in a position relatively to said member to provide a predetermined effectiveness of said fluid passage means; a freely rotatable mass; and linearly movable means connected to said rod and rotating said mass when said rod moves for preventing hunting and fluttering of said curtain means when the latter is subjected to rapid fluctuations in pressure fluid.

3. In a fluid flow control regulator, a member through which fluid is required to pass in flowing to a room or zone being conditioned; fluid passage means within said member; flexible curtain means responsive to upstream pressure variations for progressively varying the effectiveness of said fluid passage means; presettable means for normally maintaining said curtain means in a position for optimum flow of fluid through said member; movable means separate from said presettable means; and cable means connecting said movable means to said flexible curtain means, said movable means having sufficient mass whereby its inertia tends to prevent rapid reversal movements of said curtain means when said curtain means is subjected to rapid fluctuations in pressure fluid.

4. In a fluid flow control regulator, a member through which fluid is required to pass in flowing to a room or zone being conditioned; fluid passage means within said member; flexible curtain means pivotally connected at its one edge to said member; linkage means connected to another edge parallel to said one edge for controlling the movement of said curtain means; presettable means connected to said linkage for maintaining said curtain means in a predetermined position relatively to said member to provide a predetermined effectiveness of said fluid passage means; a freely rotatable mass; and cable means between said curtain means and said mass so that the latter tends to prevent flutter and hunting of said curtain means when the latter is subjected to rapid fluctuations in pressure fluid.

5. In a fluid flow control regulator, a frame having walls defining a chamber through which fluid is required to pass in flowing to a room or zone being conditioned; fluid passage means within certain of said walls; flexible curtain means pivotally connected at its one edge to said certain walls; linkage means connected to another edge parallel to said one edge for controlling the movement of said curtain means; a reciprocable rod connected to said linkage; an adjustable resilient means for normally urging said rod in a direction to maintain said curtain means in a position relatively to said certain walls to provide a predetermined effectiveness of said fluid passage means; movable means separate from said rod; and cable means between said movable means and said rod, said movable means having sufficient mass whereby its inertia tends to prevent rapid reversal movements of said curtain means when said curtain means is subjected to rapid fluctuations in pressure fluid.

6. In a fluid flow control regulator, a member through which fluid is required to pass in flowing to a room or zone being conditioned; fluid passage means within said member; flexible curtain means pivotally connected at its one edge to said member; linkage means connected to another edge parallel to said one edge for controlling the movement of said curtain means; a reciprocable rod connected to said linkage; an adjustable resilient means for normally urging said rod in a direction to maintain said curtain means in a position relatively to said member to provide a predetermined effectiveness of said fluid passage means; a freely rotatable mass; and cable means between said rod and said mass so that the latter tends to prevent rapid reversals of movement of said rod when said curtain means is subjected to rapid fluctuations in pressure fluid.

7. In a fluid flow control regulator, a member through which fluid is required to pass in flowing to a room or zone being conditioned; fluid passage means within said member; flexible curtain means pivotally connected at its one edge to said member; linkage means connected to another edge parallel to said one edge for controlling the movement of said curtain means; a reciprocable rod connected to said linkage; an adjustable resilient means for normally urging said rod in a direction to maintain said curtain means in a position relatively to said member to provide a predetermined effectiveness of said fluid passage means; a freely rotatable mass; and cable means connected to said rod and rotating said mass when said rod moves for preventing hunting and fluttering of said curtain means when the latter is subjected to rapid fluctuations in pressure fluid.

8. In a fluid flow control regulator, a member through which fluid is required to pass in flowing to a room or zone being conditioned; fluid passage means within said member; flexible curtain means responsive to upstream pressure variations for progressively varying the effectiveness of said fluid passage means; presettable means for normally maintaining said curtain means in a position for optimum flow of fluid therethrough; movable means separate from said presettable means; and rack and pinion means connecting said movable means to said flexible curtain means, said movable means having sufficient mass whereby its inertia tends to prevent rapid reversal movements of said curtain means when said curtain means is subjected to rapid fluctuations in pressure fluid.

9. In a fluid flow control regulator, a frame having walls defining a chamber through which fluid is required to pass in flowing to a room or zone being conditioned; fluid passage means within certain of said walls; flexible curtain means pivotally connected at its one edge to said certain walls; linkage means connected to another edge parallel to said one edge for controlling the movement of said curtain means; presettable means connected to said linkage for maintaining said curtain means in a predetermined position relatively to said certain walls to provide a predetermined effectiveness of said fluid passage means; a freely rotatable mass mounted within said frame; and rack and pinion means between said curtain means and said mass so that the latter tends to prevent flutter and hunting of said curtain means when the latter is subjected to rapid fluctuations in pressure fluid.

10. In a fluid flow control regulator, a frame having walls defining a chamber which fluid is required to pass in flowing to a room or zone being conditioned; fluid passage means within certain of said walls; flexible curtain means pivotally connected at its one edge to said certain walls; linkage means connected to another edge parallel to said one edge for controlling the movement of said curtain means; a reciprocable rod connected to said linkage; an adjustable resilient means for normally urging said rod in a direction to maintain said curtain means in a position relatively to said certain walls to provide a predetermined effectiveness of said fluid passage means; movable means separate from said rod; and rack and pinion means between said movable means and said rod, said movable means having sufficient mass whereby its inertia tends to prevent rapid reversal movements of said curtain means when said curtain means is subjected to rapid fluctuations in pressure fluid.

11. In a fluid control regulator, a frame having walls defining a chamber through which fluid is required to pass in flowing to a room or zone being conditioned;

fluid passage means within certain of said walls; flexible curtain means pivotally connected at its one edge to said certain walls; linkage means connected to another edge parallel to said one edge for controlling the movement of said curtain means; a reciprocable rod connected to said linkage; and adjustable resilient means for normally urging said rod in a direction to maintain said curtain means in a position relatively to said certain walls to provide a predetermined effectiveness of said fluid passage means; a freely rotatable mass mounted within said frame; and rack and pinion means between said rod and said mass so that the latter tends to prevent rapid reversals of movement of said rod when said curtain means is subjected to rapid fluctuations in pressure fluid.

12. In a fluid control regulator, a frame having walls defining a chamber through which fluid is required to pass in flowing to a room or zone being conditioned; fluid passage means within certain of said walls; flexible curtain means pivotally connected at its one edge to said certain walls; linkage means connected to another edge parallel to said one edge for controlling the movement of said curtain means; a reciprocable rod connected to said linkage; an adjustable resilient means for normally urging said rod in a direction to maintain said curtain means in a position relatively to said certain walls to provide a predetermined effectiveness of said fluid passage means; a freely rotatable mass mounted within said frame; and rack and pinion means connected to said rod and rotating said mass when said rod moves for preventing hunting and fluttering of said curtain means when the latter is subjected to rapid fluctuations in pressure fluid.

13. In a fluid flow control regulator, a member through which fluid is required to pass in flowing to a room or zone being conditioned; fluid passage means within said member; flexible curtain means responsive to upstream pressure variations for progressively varying the effectiveness of said fluid passage means; presettable means for normally maintaining said curtain means in a position for optimum flow of fluid therethrough; inertia means separate from said presettable means and movable in response to the movement of said curtain means; and cam means connecting said inertia means to said flexible curtain means, whereby the inertia means tends to prevent rapid reversal movements of said curtain means when said curtain means is subjected to rapid fluctuations in pressure fluid.

14. In a fluid flow control regulator, a member through which fluid is required to pass in flowing to a room or zone being conditioned; fluid passage means within said member; flexible curtain means pivotally connected at its one edge to said member; linkage means connected to another edge parallel to said one edge for controlling the movement of said curtain means; presettable means connected to said linkage for maintaining said curtain means in a predetermined position relatively to said member to provide a predetermined effectiveness of said fluid passage means; a freely rotatable mass; and coarse pitch threaded means connected to said linkage means and rotating said mass upon movement of said flexible curtain means, whereby the inertia of said mass tends to prevent rapid reversal movements of said curtain means when said curtain means is subjected to rapid fluctuations in pressure fluid.

15. In a fluid flow control regulator, a frame having walls defining a chamber through which fluid is required to pass in flowing to a room or zone being conditioned; fluid passage means within certain of said walls; flexible curtain means pivotally connected at its one edge to said certain walls; linkage means connected to another edge parallel to said one edge for controlling the movement of said curtain means; a reciprocable rod connected to said linkage; an adjustable resilient means for normally urging said rod in a direction to maintain said curtain means in a position relatively to said certain walls to provide a predetermined effectiveness of said fluid passage means; inertia means separate from said rod and movable in response to said curtain means; and coarse pitch threaded means connecting said inertia means to said flexible curtain means, said inertia means having sufficient mass whereby its inertia tends to prevent rapid reversal movements of said curtain means when said curtain means is subjected to rapid fluctuations in pressure fluid.

16. In a fluid flow control regulator, a frame having walls defining a chamber through which fluid is required to pass in flowing to a room or zone being conditioned; fluid passage means within certain of said walls; flexible curtain means pivotally connected at its one edge to said certain walls; linkage means connected to another edge parallel to said one edge for controlling the movement of said curtain means; a reciprocable rod connected to said linkage; an adjustable resilient means for normally urging said rod in a direction to maintain said curtain means in a position relatively to said certain walls to provide a predetermined effectiveness of said fluid passage means; a freely rotatable mass mounted within said frame; and coarse pitch threaded means between said rod and mass, and effecting rotation of said mass when said rod moves for preventing hunting and fluttering of said curtain means when the latter is subjected to rapid fluctuations in pressure fluid.

17. In a fluid flow control regulator, a member; fluid passage means within said member through which fluid is required to pass in flowing to a room or zone being conditioned; flexible curtain means pivotally connected at its one edge to said member; linkage means connected to another edge parallel to said one edge for controlling the movement of said curtain means; a reciprocable rod connected to said linkage; a resilient means for normally urging said rod in a direction to maintain said curtain means in a position relatively to said member to provide a predetermined effectiveness of said fluid passage means; a freely rotatable mass; and a connection between said rod and said mass so that the mass is rotated upon movement of the curtain means whereby the mass tends to prevent rapid reversals of movement of said rod when said curtain means is subjected to rapid fluctuations in pressure fluid.

References Cited in the file of this patent

UNITED STATES PATENTS

| | | |
|---|---|---|
| 69,624 | Brown | Oct. 8, 1867 |
| 353,134 | Hands et al. | Nov. 23, 1886 |
| 796,723 | Hewitt | Aug. 8, 1905 |
| 970,599 | Arnold | Sept. 20, 1910 |
| 1,067,777 | Arnold | July 15, 1913 |
| 2,322,039 | Lunda et al. | June 15, 1943 |
| 2,637,338 | Troendle | May 5, 1953 |
| 2,868,494 | Kearns | Jan. 13, 1959 |
| 2,890,716 | Werder | June 16, 1959 |